(12) United States Patent
Hyodo et al.

(10) Patent No.: US 10,033,266 B2
(45) Date of Patent: Jul. 24, 2018

(54) POWER CONVERSION DEVICE AND CONTROL DEVICE

(71) Applicant: OMRON Corporation, Kyoto-shi, Kyoto (JP)

(72) Inventors: Takashi Hyodo, Kusatsu (JP); Shuhei Kato, Chigasaki (JP)

(73) Assignee: OMRON Corporation, Kyoto-shi (JP)

( * ) Notice: Subject to any disclaimer, the term of this patent is extended or adjusted under 35 U.S.C. 154(b) by 0 days.

(21) Appl. No.: 15/119,742

(22) PCT Filed: Feb. 19, 2015

(86) PCT No.: PCT/JP2015/054527
§ 371 (c)(1),
(2) Date: Aug. 18, 2016

(87) PCT Pub. No.: WO2015/133282
PCT Pub. Date: Sep. 11, 2015

(65) Prior Publication Data
US 2017/0063219 A1   Mar. 2, 2017

(30) Foreign Application Priority Data
Mar. 3, 2014   (JP) .................................. 2014-040196

(51) Int. Cl.
*H02M 1/42*   (2007.01)
*H02M 1/34*   (2007.01)
*H02M 7/219*   (2006.01)

(52) U.S. Cl.
CPC ........... *H02M 1/4233* (2013.01); *H02M 1/34* (2013.01); *H02M 7/219* (2013.01); *Y02B 70/126* (2013.01); *Y02P 80/112* (2015.11)

(58) Field of Classification Search
CPC ...... H02M 1/4233; H02M 1/34; H02M 7/219; Y02P 80/112; Y02B 70/126
See application file for complete search history.

(56) References Cited

U.S. PATENT DOCUMENTS 5,414,613 A * 5/1995 Chen ...................... H02H 7/125
363/52
5,561,595 A   10/1996 Smith
(Continued)

FOREIGN PATENT DOCUMENTS

CN   1276927 A   12/2000
CN   203151368 U   8/2013
(Continued)

OTHER PUBLICATIONS

Isobe et al., "A Soft-Switching Active Rectifier That Uses a Magnetic Energy Recovery Switch", IEEJ Transactions on Industry Applications, 2011, p. 793-800, vol. 131 No. 6, The Institute of Electrical Engineers of Japan.
(Continued)

*Primary Examiner* — Adolf Berhane
*Assistant Examiner* — Bart Iliya
(74) *Attorney, Agent, or Firm* — MetroLexis Law Group, PLLC

(57) ABSTRACT

A power conversion device includes: a bridge circuit; a filter provided on an alternating current side of the bridge circuit, and connected to a neutral point; a reactor between the bridge circuit and the filter; a smoothing circuit provided on a direct current side of the bridge circuit; a snubber circuit between the bridge circuit and the smoothing circuit; and a switch circuit provided between the smoothing circuit and the snubber circuit. The smoothing circuit includes two smoothing capacitors connected in series between a positive line and a negative line. The neutral point is connected between the two smoothing capacitors. The snubber circuit includes two snubber capacitors connected in series between the positive line and the negative line. The neutral point is connected between the two snubber capacitors. The switch
(Continued)

circuit includes a first switch provided on the positive line and a second switch provided on the negative line.

9 Claims, 16 Drawing Sheets

(56) References Cited

U.S. PATENT DOCUMENTS

| | | | | |
|---|---|---|---|---|
| 5,574,635 | A * | 11/1996 | Philippe | H02M 1/4216 363/124 |
| 6,226,192 | B1 * | 5/2001 | Yamanaka | H02M 1/34 363/132 |
| 2003/0123203 | A1 * | 7/2003 | Telefus | H02H 9/005 361/58 |
| 2005/0168167 | A1 * | 8/2005 | Yu | H05B 41/2828 315/244 |
| 2011/0096577 | A1 | 4/2011 | Yamada | |
| 2012/0305337 | A1 * | 12/2012 | Hopp | B66B 13/306 187/336 |
| 2013/0016545 | A1 | 1/2013 | Xu et al. | |
| 2014/0097747 | A1 * | 4/2014 | Bader | H01J 23/34 315/3 |
| 2015/0263527 | A1 * | 9/2015 | Anders | B60L 11/182 307/9.1 |

FOREIGN PATENT DOCUMENTS

| | | |
|---|---|---|
| JP | 2001-286160 A | 10/2001 |
| JP | 2010-110179 A | 5/2010 |
| JP | 2013-183542 A | 9/2013 |

OTHER PUBLICATIONS

Yoshitsugu Miyaji et al., A Soft-Switching Active Rectifier Using a Concept of Magnetic Energy Recovery Switch, XP031728865, ISBN: 978-1-4244-5394-8, 2010 International Power Electronics Conference, IPEC—Sapporo 2010 (ECCE Asia) Sapporo, Japan, Jun. 21, 2010 (Jun. 21, 2010), pp. 2318-2323, IEEE, Piscataway, NJ, USA, Cited in the EESR dated Oct. 11, 2017.

Natarjan K et al., Control of Cusp Distortion in Power Factor Correcting Boost Converter, XP010235090, DOI: 10.1109/CECE. 1997.608319, ISBN: 978-0-7803-3716-9, Electrical and Computer Engineering, 1997, Engineering Innovation: Voyage of Discovery, IEEE 1997, Canadian Conference on St. Johns, NFLD., Canada, May 25-28, 1997, May 25, 1997 (May 25, 1997), pp. 650-653, vol. 2, IEEE, New York, NY, USA, Cited in the EESR dated Oct. 11, 2017.

Fraser M E et al., Four-Wire Power Factor Corrected Boost Rectifier, XP000538336, EPE '95: 6th. European Conference on Power Electronics and Applications, Sevilla, Sep. 19-21, 1995, Sep. 19, 1995 (Sep. 19, 1995), pp. 3.351-3.355, vol. 3, EPE Association, Brussels, Cited in the EESR dated Oct. 11, 2017.

Extended European search report (EESR) dated Oct. 11, 2017 in a counterpart European patent application.

Chinese Office Action dated Dec. 27, 2017 in a counterpart Chinese patent application.

* cited by examiner

POWER CONVERSION DEVICE AND CONTROL DEVICE

TECHNICAL FIELD

The present invention relates to a power conversion device and a control device that controls the power conversion device.

BACKGROUND ART

Conventionally, there is known a power conversion device such as a PFC (Power Factor Correction) circuit (for example, see Non-Patent Document 1).

The PFC circuit of Non-Patent Document 1 includes a bridge circuit, a high-frequency filter provided on an AC side of the bridge circuit, a reactor provided between the bridge circuit and the high-frequency filter, a smoothing capacitor provided on a DC side of the bridge circuit, a snubber capacitor provided between the bridge circuit and the smoothing capacitor, and a backflow prevention diode provided between the smoothing capacitor and the snubber capacitor. In the PFC circuit, a three-phase AC power supply is connected onto an input side, and a load is connected onto an output side.

Three legs constructed with upper arms and lower arms are provided in the bridge circuit. A switch element is provided in each arm (upper arm and lower arm), and a diode is connected in parallel to the switch element. In the bridge circuit, the switch element of the upper arm or lower arm in each leg is selected according to a phase of an AC voltage (input voltage), and the three selected switch elements are driven at a constant duty ratio. The PFC circuit operates in a DCM (Discontinuous Current Mode), and current is discontinuously passed through the reactor.

In the PFC circuit of Non-Patent Document 1, the switch element of the bridge circuit is turned off when the current is not passed through the reactor, thereby performing ZCS (Zero Current Switching). In the PFC circuit, the switch element of the bridge circuit is turned off while the snubber capacitor is discharged, thereby performing ZVS (Zero Voltage Switching). Therefore, a switching loss can be reduced.

PRIOR ART DOCUMENT

Non-Patent Document

Non-Patent Document 1: Takanori Isobe, Yoshitsugu Miyaji, Kazuhiro Usuki, Tatsuya Matsukawa, and Ryuichi Shimada, "A Soft-Switching Active Rectifier That Uses a Magnetic Energy Recovery Switch", IEEJ Transactions on Industry Applications Vol. 131(2011) No. 6 p. 793-800

SUMMARY OF THE INVENTION

Problems to be Solved by the Invention

However, in the conventional PFC circuit, there is a problem in that a distortion is generated in a waveform of the current input from the three-phase AC power supply to the PFC circuit. That is, there is a problem in that a THD (Total Harmonic Distortion) increases. FIG. 16 illustrates waveforms of the AC voltage and input current in the conventional PFC circuit. As illustrated in FIG. 16, the distortion is generated in the input current when the AC voltage is close to zero crossing. When another phase of the AC voltage is close to the zero crossing (such as a point of time the phase of the AC voltage is 60 degrees), another phase affects the input current to generate the distortion.

An object of the present invention is to provide a power conversion device and a control device for being able to shape the waveform of the input current.

Means for Solving the Problem

A power conversion device according to one aspect of the present invention includes: a bridge circuit in which a switch element is provided in each of plural arms; a filter that is provided on an alternating current side of the bridge circuit, and connected to a neutral point; a reactor provided between the bridge circuit and the filter; a smoothing circuit provided on a direct current side of the bridge circuit; a snubber circuit provided between the bridge circuit and the smoothing circuit; and a switch circuit provided between the smoothing circuit and the snubber circuit. The smoothing circuit includes two smoothing capacitors connected in series between a positive line and a negative line, and the neutral point is connected between the two smoothing capacitors. The snubber circuit includes two snubber capacitors connected in series between the positive line and the negative line, and the neutral point is connected between the two snubber capacitors. The switch circuit includes a first switch provided on the positive line and a second switch provided on the negative line.

In the above configuration of the power conversion device, even if the AC voltage is close to the zero crossing, the low-impedance current passage through the smoothing capacitor is formed using the switch circuit, and the current passed through the reactor easily rises. Therefore, the waveform of the input current can be shaped.

In the power conversion device, current may discontinuously be passed through the reactor.

In the power conversion device, the switch elements of the bridge circuit may be driven with different duty ratios, the first switch may be turned on when one of the switch elements of an upper arm in the bridge circuit is initially turned on in each switching cycle, and the second switch may be turned on when one of the switch elements of a lower arm in the bridge circuit is initially turned on in each switching cycle.

In the power conversion device, the switch element of the bridge circuit may be turned off while the two snubber capacitors are discharged.

A control device according to another aspect of the present invention is configured to control a power conversion device. At this point, the power conversion device includes: a bridge circuit in which a switch element is provided in each of plural arms; a filter that is provided on an alternating current side of the bridge circuit, and connected to a neutral point; a reactor provided between the bridge circuit and the filter; a smoothing circuit provided on a direct current side of the bridge circuit; a snubber circuit provided between the bridge circuit and the smoothing circuit; and a switch circuit provided between the smoothing circuit and the snubber circuit. The smoothing circuit includes two smoothing capacitors connected in series between a positive line and a negative line, and the neutral point is connected between the two smoothing capacitors. The snubber circuit includes two snubber capacitors connected in series between the positive line and the negative line, and the neutral point is connected between the two snubber capacitors. The switch circuit includes a first switch provided on the positive line and a second switch provided on the negative line. The control device is configured to control the bridge circuit and the switch circuit based on an input voltage, an input current, and an output voltage of the power conversion device.

In the above configuration of the control device, even if the AC voltage is close to the zero crossing, the low-impedance current passage through the smoothing capacitor is formed using the switch circuit, and the current passed through the reactor easily rises. Therefore, the waveform of the input current can be shaped.

Effect of the Invention

In the power conversion device and control device of the present invention, the waveform of the input current can be shaped.

MODES FOR CARRYING OUT THE INVENTION

An exemplary embodiment of the present invention will be described below with reference to the drawings.

First Embodiment (Circuit Configuration of PFC Circuit)

A circuit configuration of a PFC circuit 100 according to a first embodiment of the present invention will be described below with reference to FIG. 1. The PFC circuit 100 is an example of the "power conversion device" of the present invention.

Figure 1:
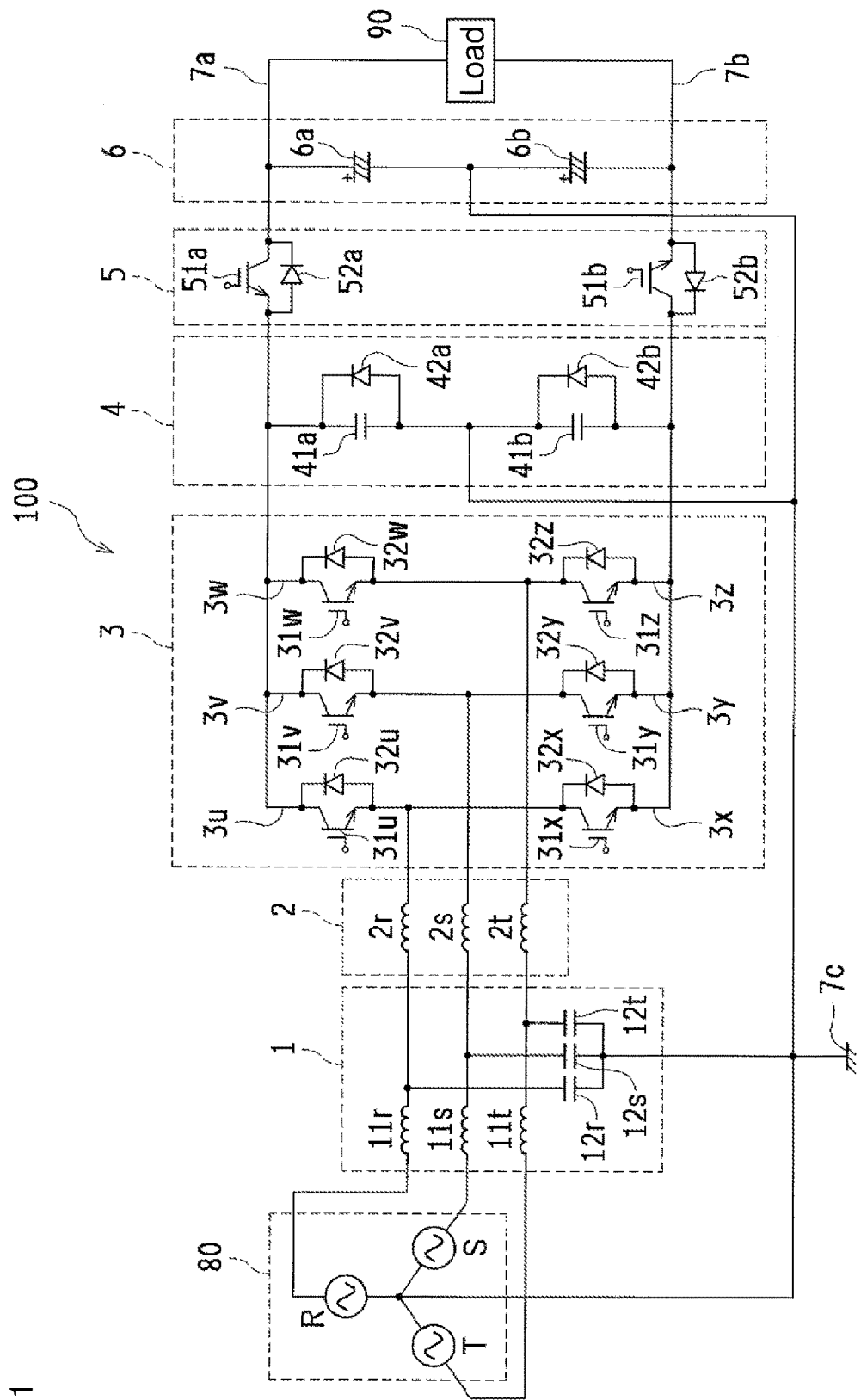
FIG. 1 is a circuit diagram illustrating a configuration of a PFC circuit according to a first embodiment of the present invention.

As illustrated in FIG. 1, the PFC circuit 100 includes a high-frequency filter 1, a reactor 2, a bridge circuit 3, a snubber circuit 4, a switch circuit 5, and a smoothing circuit 6. In the PFC circuit 100, a three-phase AC power supply (system power supply) 80 is connected to an input side, and a load 90 is connected to an output side. For example, each phase of the three-phase AC power supply 80 is connected to a neutral point 7c.

The high-frequency filter 1 is disposed between the three-phase AC power supply 80 and the reactor 2, and disposed on an AC side of the bridge circuit 3. The high-frequency filter 1 is provided to remove the high-frequency noise component. The high-frequency filter 1 includes an R-phase reactor 11r and a capacitor 12r, an S-phase reactor 11s and a capacitor 12s, and a T-phase reactor 11t and a capacitor 12t.

Specifically, in the reactor 11r, one end is connected to an R phase of the three-phase AC power supply 80, and the other end is connected to the reactor 2. In the capacitor 12r, one of electrodes is connected to the other end of the reactor 11r, and the other electrode is connected to the neutral point 7c. In the reactor 11s one end is connected to an S phase of the three-phase AC power supply 80, and the other end is connected to the reactor 2. In the capacitor 12s, one of electrodes is connected to the other end of the reactor 11s, and the other electrode is connected to the neutral point 7c. In the reactor 11t, one end is connected to a T phase of the three-phase AC power supply 80, and the other end is connected to the reactor 2. In the capacitor 12t, one of electrodes is connected to the other end of the reactor 11t, and the other electrode is connected to the neutral point 7c.

The reactor 2 is disposed between the high-frequency filter 1 and the bridge circuit 3. The reactor 2 is provided such that the current becomes discontinuous due to resonance. The reactor 2 includes an R-phase reactor 2r, an S-phase reactor 2s, and a T-phase reactor 2t. Specifically, one end of the reactor 2r is connected to the other end of the reactor 11r, one end of the reactor 2s is connected to the other end of the reactor 11s, and one end of the reactor 2t is connected to the other end of the reactor 11t.

The bridge circuit 3 is provided in order that the power supplied from the three-phase AC power supply 80 is supplied to the load 90 while converted an alternating current (AC) into a direct current (DC). The bridge circuit 3 includes a U-phase arm 3u, a V-phase arm 3v, a W-phase arm 3w, an X-phase arm 3x, a Y-phase arm 3y, and a Z-phase arm 3z. The U-phase arm 3u, the V-phase arm 3v, and the W-phase arm 3w are the upper arm, and the X-phase arm 3x, the Y-phase arm 3y, and the Z-phase arm 3z are the lower arm. The U-phase arm 3u and the X-phase arm 3x constitute one leg, the V-phase arm 3v and the Y-phase arm 3y constitute one leg, and the W-phase arm 3w and the Z-phase arm 3z constitute one leg.

An IGBT (Insulated Gate Bipolar Transistor) 31u is provided in the U-phase arm 3u, and a diode 32u is provided in parallel to the IGBT 31u. In the IGBT 31u, a collector is connected to a positive line 7a, and an emitter is connected to the other end of the reactor 2r and the X-phase arm 3x. In the diode 32u, a cathode is connected to the positive line 7a, and an anode is connected to the other end of the reactor 2r and the X-phase arm 3x.

An IGBT 31v is provided in the V-phase arm 3v, and a diode 32v is provided in parallel to the IGBT 31v. In the IGBT 31v, the collector is connected to the positive line 7a, and the emitter is connected to the other end of the reactor 2s and the Y-phase arm 3y. In the diode 32v, the cathode is connected to the positive line 7a, and an anode is connected to the other end of the reactor 2s and the Y-phase arm 3y.

An IGBT 31w is provided in the W-phase arm 3w, and a diode 32w is provided in parallel to the IGBT 31w. In the IGBT 31w, the collector is connected to the positive line 7a, and the emitter is connected to the other end of the reactor 2t and the Z-phase arm 3z. In the diode 32w, the cathode is connected to the positive line 7a, and an anode is connected to the other end of the reactor 2t and the Z-phase arm 3z.

An IGBT 31x is provided in the X-phase arm 3x, and a diode 32x is provided in parallel to the IGBT 31x. In the IGBT 31x, the collector is connected to the other end of the reactor 2r and the U-phase arm 3u, and the emitter is connected to a negative line 7b. In the diode 32x, the cathode is connected to the other end of the reactor 2r and the U-phase arm 3u, and the anode is connected to the negative line 7b.

An IGBT 31y is provided in the Y-phase arm 3y, and a diode 32y is provided in parallel to the IGBT 31y. In the IGBT 31y, the collector is connected to the other end of the reactor 2s and the V-phase arm 3v, and the emitter is connected to the negative line 7b. In the diode 32y, the cathode is connected to the other end of the reactor 2s and the V-phase arm 3v, and the anode is connected to the negative line 7b.

An IGBT 31z is provided in the Z-phase arm 3z, and a diode 32z is provided in parallel to the IGBT 31z. In the IGBT 31z, the collector is connected to the other end of the reactor 2t and the W-phase arm 3w, and the emitter is connected to the negative line 7b. In the diode 32z, the cathode is connected to the other end of the reactor 2t and the W-phase arm 3w, and the anode is connected to the negative line 7b.

The IGBTs 31u, 31v, 31w, 31x, 31y, and 31z are examples of the "switch element" of the present invention.

The snubber circuit 4 is disposed between the bridge circuit 3 and the switch circuit 5. The snubber circuit 4 acts as a protective circuit that absorbs a transient high voltage. The snubber circuit 4 includes two snubber capacitors 41a and 41b connected in series between the positive line 7a and the negative line 7b. The neutral point 7c is connected between the snubber capacitors 41a and 41b.

A diode 42a is connected in parallel to the snubber capacitor 41a. In the diode 42a, the cathode is connected to the positive line 7a, and the anode is connected to the neutral point 7c. A diode 42b is connected in parallel to the snubber capacitor 41b. In the diode 42b, the cathode is connected to the neutral point 7c, and the anode is connected to the negative line 7b.

The switch circuit 5 is disposed between the snubber circuit 4 and the smoothing circuit 6. The switch circuit 5 is provided to form a low-impedance current passage through a smoothing capacitor 6a or 6b (to be described later). The detailed description is made later.

The switch circuit 5 includes an IGBT 51a provided on the positive line 7a and a diode 52a provided in parallel to the IGBT 51a. In the IGBT 51a, the emitter is connected to the snubber circuit 4, and the collector is connected to the smoothing circuit 6. In the diode 52a, the anode is connected to the snubber circuit 4, and the cathode is connected to the smoothing circuit 6. The IGBT 51a is an example of the "first switch" of the present invention.

The switch circuit 5 includes an IGBT 51b provided on the negative line 7b and a diode 52b provided in parallel to the IGBT 51b. In the IGBT 51b, the collector is connected to the snubber circuit 4, and the emitter is connected to the smoothing circuit 6. In the diode 52b, the cathode is connected to the snubber circuit 4, and the anode is connected to the smoothing circuit 6. The IGBT 51b is an example of the "second switch" of the present invention.

The smoothing circuit 6 is disposed between the switch circuit 5 and the load 90, and disposed on the DC side of the bridge circuit 3. The smoothing circuit 6 is provided to smooth output of the bridge circuit 3. The smoothing circuit 6 includes the two smoothing capacitors 6a and 6b connected in series between the positive line 7a and the negative line 7b. The neutral point 7c is connected between the smoothing capacitors 6a and 6b. For example, the smoothing capacitors 6a and 6b are an electrolytic capacitor, and have capacitances larger than those of the snubber capacitors 41a and 41b.

A control device 200 (to be described later) controls the bridge circuit 3 and the switch circuit 5 to operate the PFC circuit 100.

(Control Device of PFC Circuit)

A configuration of the control device 200 that controls the PFC circuit 100 will be described below with reference to FIGS. 1 to 3.

The control device 200 generates a PWM signal to drive the IGBTs 31u, 31v, 31w, 31x, 31y, and 31z of the bridge circuit 3, and drives the IGBTs 51a and 51b of the switch circuit 5 based on the PWM signal.

Figure 3:
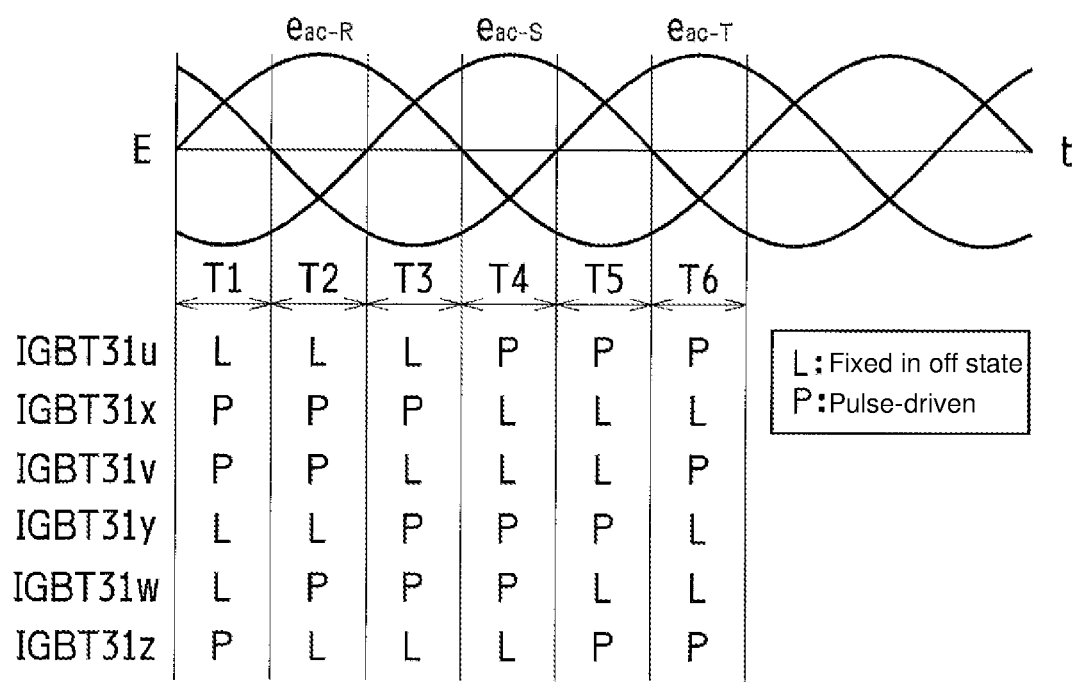
FIG. 3 is a view illustrating a switching pattern of a bridge circuit in the PFC circuit.

FIG. 3 illustrates a switching pattern of the bridge circuit 3. As illustrated in FIG. 3, the three-phase AC power supply 80 outputs sinusoidal AC voltages $e_{ac-R}$, $e_{ac-S}$, and $e_{ac-T}$. The control device 200 drives the lower-arm IGBT corresponding to the positive AC voltage of each phase, and drives the upper-arm IGBT corresponding to the negative AC voltage of each phase. That is, the upper or lower arm of each leg is selected according to the AC voltage, and the selected three IGBTs are pulse-driven.

For example, in a period T1 in FIG. 3, the R-phase AC voltage $e_{ac-R}$ and the T-phase AC voltage $e_{ac-T}$ are positive, and the S-phase AC voltage $e_{ac-S}$ is negative. At this point, in the leg corresponding to the R phase, the IGBT 31u of the U-phase arm 3u of the upper arm is fixed in an off state, and the IGBT 31x of the X-phase arm 3x of the lower arm is pulse-driven at a switching frequency (carrier frequency). In the leg corresponding to the S phase, the IGBT 31v of the V-phase arm 3v of the upper arm is pulse-driven at the switching frequency, and the IGBT 31y of the Y-phase arm 3y of the lower arm is fixed in the off state. In the leg corresponding to the T phase, the IGBT 31w of the W-phase arm 3w of the upper arm is fixed in the off state, and the IGBT 31z of the Z-phase arm 3z of the lower arm is pulse-driven at the switching frequency. Duty ratios (an on period to a switching-frequency period) of the pulse-driven IGBTs 31x, 31v, and 31z are described in detail later.

Figure 2:
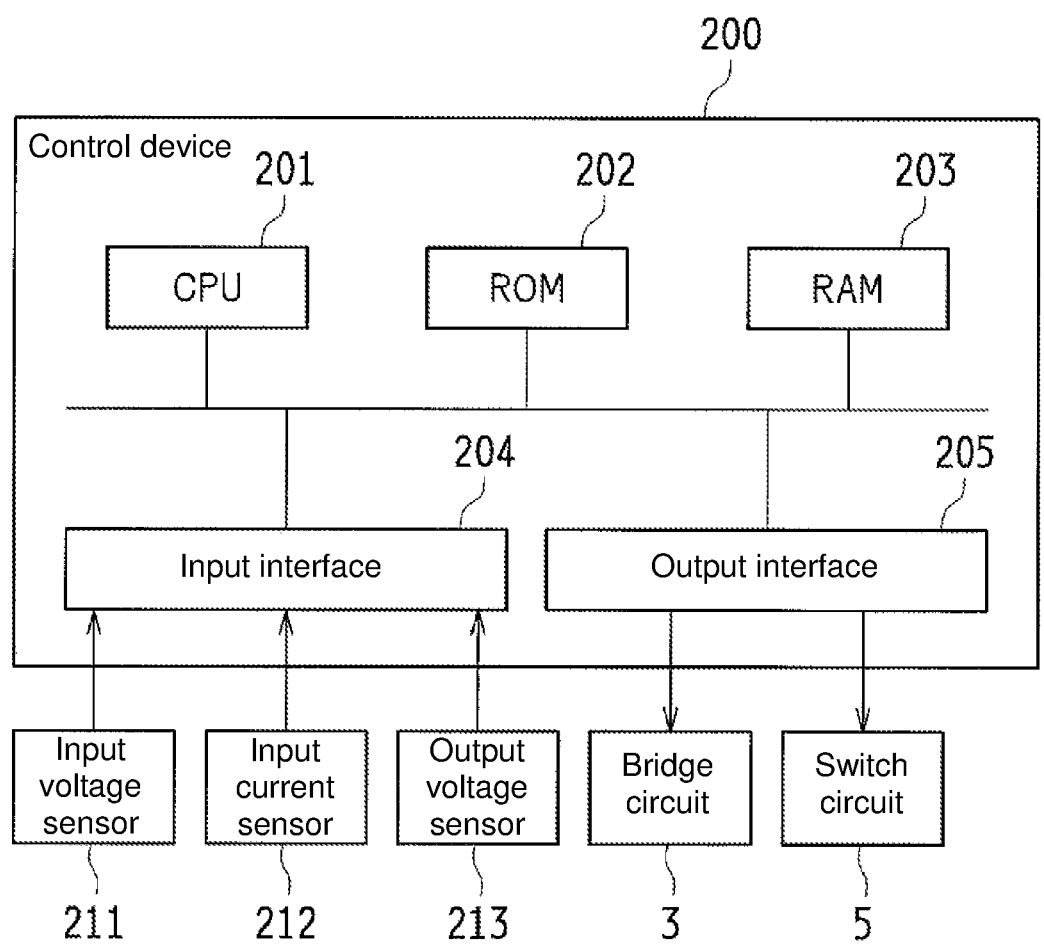
FIG. 2 is a block diagram illustrating a configuration of the control device that controls the PFC circuit.

As illustrated in FIG. 2, the control device 200 includes a CPU 201, a ROM 202, a RAM 203, an input interface 204, and an output interface 205.

The CPU 201 executes a program stored in the ROM 202. The program and a setting value used to execute the program are stored in the ROM 202. The RAM 203 has a function of temporarily storing a detection result of a sensor.

An input voltage sensor 211, an input current sensor 212, and an output voltage sensor 213 are connected to the input interface 204, and the bridge circuit 3 and gates of the IGBTs of the switch circuit 5 are connected to the output interface 205. The detection result of each sensor is input to the input interface 204, and a drive signal driving each IGBT is output from the output interface 205.

The input voltage sensor 211 is provided to detect the AC voltage (input voltage) $e_{ac}$ of each phase output from the three-phase AC power supply 80. Specifically, the input voltage sensor 211 detects the R-phase AC voltage $e_{ac-R}$, the S-phase AC voltage $e_{ac-S}$, and the T-phase AC voltage $e_{ac-T}$.

The input current sensor 212 is provided to detect an input current $I_{ac,filt}$ of each phase input to the high-frequency filter 1 of the PFC circuit 100. Specifically, input current sensor 212 detects an R-phase input current $I_{ac,filt-R}$, an S-phase input current $I_{ac,filt-S}$, and a T-phase input current $I_{ac,filt-T}$.

The output voltage sensor 213 is provided to detect an output voltage $V_{dc}$ output from the PFC circuit 100 to the load 90.

The control device 200 selects the IGBT to be driven in the bridge circuit 3 on the basis of the detection result of the input voltage sensor 211, and generates the PWM signal to drive the selected IGBT on the basis of the detection results of the input voltage sensor 211, input current sensor 212, and output voltage sensor 213.

Specifically, the control device 200 selects the IGBT 31$u$ or 31$x$ on the basis of the AC voltage $e_{ac-R}$ in each switching cycle, and drives the selected IGBT 31$u$ or 31$x$ at the duty ratio calculated from the following equation (1).

[Mathematical formula 1]

$$\text{Duty\_Pux} = \sqrt{\sqrt{2}\, I_{ac,filt-R} \frac{L_{reso-R} f_{sw}\left(\frac{V_{dc}}{2} - |e_{ac-R}|\right)|\sin\theta_R|}{\frac{V_{dc}}{2}\left(\frac{V_{dc}}{2} + |e_{ac-R}|\right)}} \quad (1)$$

In the equation (1), Duty_Pux is the duty ratio of the selected IGBT 31$u$ or 31$x$. $I_{ac,filt-R}$[A] is the input current input from the R phase to the high-frequency filter 1, and $L_{reso-R}$[H] is inductance of the reactor 2$r$. $f_{sw}$[HZ] is the switching frequency, and $V_{dc}$[V] is the output voltage at the PFC 100. $e_{ac-R}$[V] is the R-phase AC voltage, and $\theta_R$[rad] is the phase of the R-phase AC voltage.

The control device 200 selects the IGBT 31$v$ or 31$y$ on the basis of the AC voltage $e_{ac-S}$ in each switching cycle, and drives the selected IGBT 31$v$ or 31$y$ at the duty ratio calculated from the following equation (2).

[Mathematical formula 2]

$$\text{Duty\_Pvy} = \sqrt{\sqrt{2}\, I_{ac,filt-S} \frac{L_{reso-S} f_{sw}\left(\frac{V_{dc}}{2} - |e_{ac-S}|\right)|\sin\theta_S|}{\frac{V_{dc}}{2}\left(\frac{V_{dc}}{2} + |e_{ac-S}|\right)}} \quad (2)$$

In the equation (2), Duty_Pvy is the duty ratio of the selected IGBT 31$v$ or 31$y$. $I_{ac,filt-S}$[A] is the input current input from the S phase to the high-frequency filter 1. $L_{reso-S}$[H] is inductance of the reactor 2$s$, and the inductance of the reactor 2$s$ is substantially equal to that of the reactor 2$r$. $e_{ac-S}$[V] is the S-phase AC voltage, and $\theta_S$[rad] is the phase of the S-phase AC voltage.

The control device 200 selects the IGBT 31$w$ or 31$z$ on the basis of the AC voltage $e_{ac-T}$ in each switching cycle, and drives the selected IGBT 31$w$ or 31$z$ at the duty ratio calculated from the following equation (3).

[Mathematical formula 3]

$$\text{Duty\_Pwz} = \sqrt{\sqrt{2}\, I_{ac,filt-T} \frac{L_{reso-T} f_{sw}\left(\frac{V_{dc}}{2} - |e_{ac-T}|\right)|\sin\theta_T|}{\frac{V_{dc}}{2}\left(\frac{V_{dc}}{2} + |e_{ac-T}|\right)}} \quad (3)$$

In the equation (3), Duty_Pwz is the duty ratio of the selected IGBT 31$w$ or 31$z$. $I_{ac,filt-T}$[A] is the input current input from the T phase to the high-frequency filter 1. $L_{reso-T}$[H] is inductance of the reactor 2$t$, and the inductance of the reactor 2$t$ is substantially equal to that of the reactors 2$r$ and 2$s$. $e_{ac-T}$[V] is the T-phase AC voltage, and $\theta_T$[rad] is the phase of the T-phase AC voltage.

As described above, in the first embodiment, the selected IGBT of the bridge circuit 3 is driven at the different duty ratio.

The control device 200 drives the IGBTs 51$a$ and 51$b$ of the switch circuit 5 on the basis of the PWM signal. Specifically, in each switching cycle, the control device 200 turns on the IGBT 51$a$ when one of the IGBTs 31$u$, 31$v$, and 31$w$ of the upper arm is initially turned on. In each switching cycle, the control device 200 turns on the IGBT 51$b$ when one of the IGBTs 31$x$, 31$y$, and 31$z$ of the lower arm is initially turned on. The turned-on IGBTs 51$a$ and 51$b$ are turned off after a predetermined period elapses.

(Operation of PFC Circuit)

The operation of the PFC circuit 100 controlled with the control device 200 will be described below with reference to FIGS. 1 to 13.

As to a general flow of the operation of the PFC circuit 100, first the three-phase AC power supply 80 outputs the sinusoidal AC voltages $e_{ac-R}$, $e_{ac-S}$, and $e_{ac-T}$ in FIG. 3 to the PFC circuit 100. At this point, the control device 200 drives the bridge circuit 3 and switch circuit 5 of the PFC circuit 100 in each switching cycle. Periods T1 to T6 in FIG. 3 are repeated. The switching cycle is previously set, and is shorter than the period T1.

Figure 4:
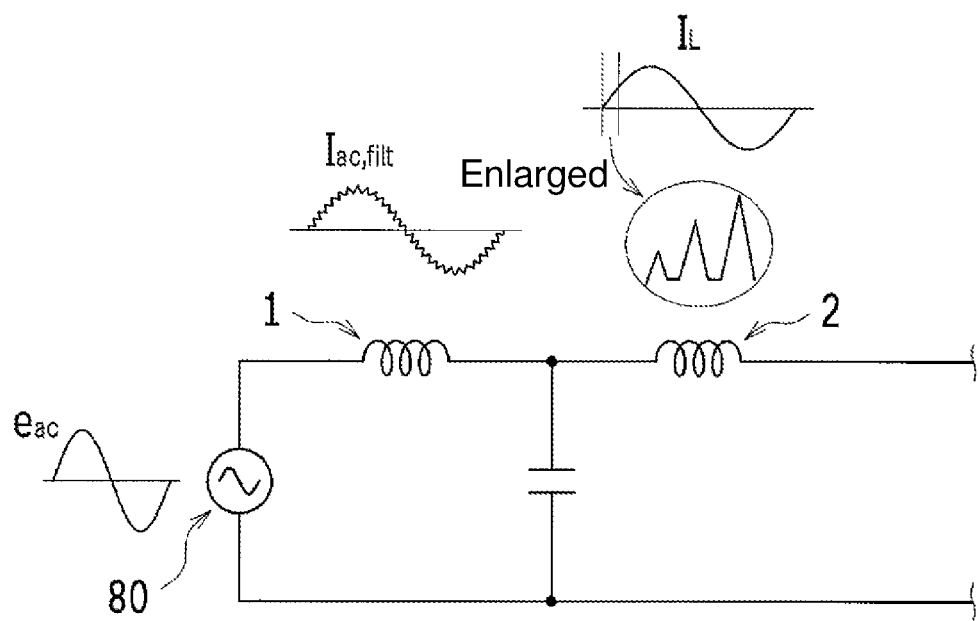
FIG. 4 is a schematic diagram schematically illustrating waveforms (a waveform of an AC voltage $e_{ac}$, a waveform of an input current $I_{ac,filt}$, and a waveform of a current $I_L$ passed through a reactor) on an input side of a predetermined phase of the PFC circuit.

The control device 200 controls the PFC circuit 100 such that the PFC circuit 100 operates in the DCM (Discontinuous Current Mode). As illustrated in FIG. 4, the DCM is operating mode in which the period during which the currents passed through the reactors 2$r$, 2$s$, and 2$t$ become zero in each switching cycle occurs. For convenience, FIG. 4 illustrates only one phase on the input side of the PFC circuit 100. In the PFC circuit 100, the selected IGBT of the bridge circuit 3 is driven at the different duty ratio.

The detailed operation of the PFC circuit 100 will be described below. An initial switching cycle of the period T1 in FIG. 3 will be described as an example. That is, the operation in the case that the R-phase AC voltage $e_{ac-R}$ is close to zero volt will be described.

The control device 200 selects the IGBT to be driven in each leg on the basis of the detection result of the input voltage sensor 211. In the period T1, the R-phase AC voltage $e_{ac-R}$ and the T-phase AC voltage $e_{ac-T}$ are positive, and the S-phase AC voltage $e_{ac-S}$ is negative. Therefore, the IGBTs 31x, 31v, and 31z are selected.

The control device 200 calculates the duty ratio of the IGBT 31x from the equation (1) on the basis of the detection results of the input voltage sensor 211, input current sensor 212, and output voltage sensor 213. The control device 200 calculates the duty ratio of the IGBT 31v from the equation (2) on the basis of the detection results of the input voltage sensor 211, input current sensor 212, and output voltage sensor 213. The control device 200 calculates the duty ratio of the IGBT 31z from the equation (3) on the basis of the detection results of the input voltage sensor 211, input current sensor 212, and output voltage sensor 213.

Figure 5:
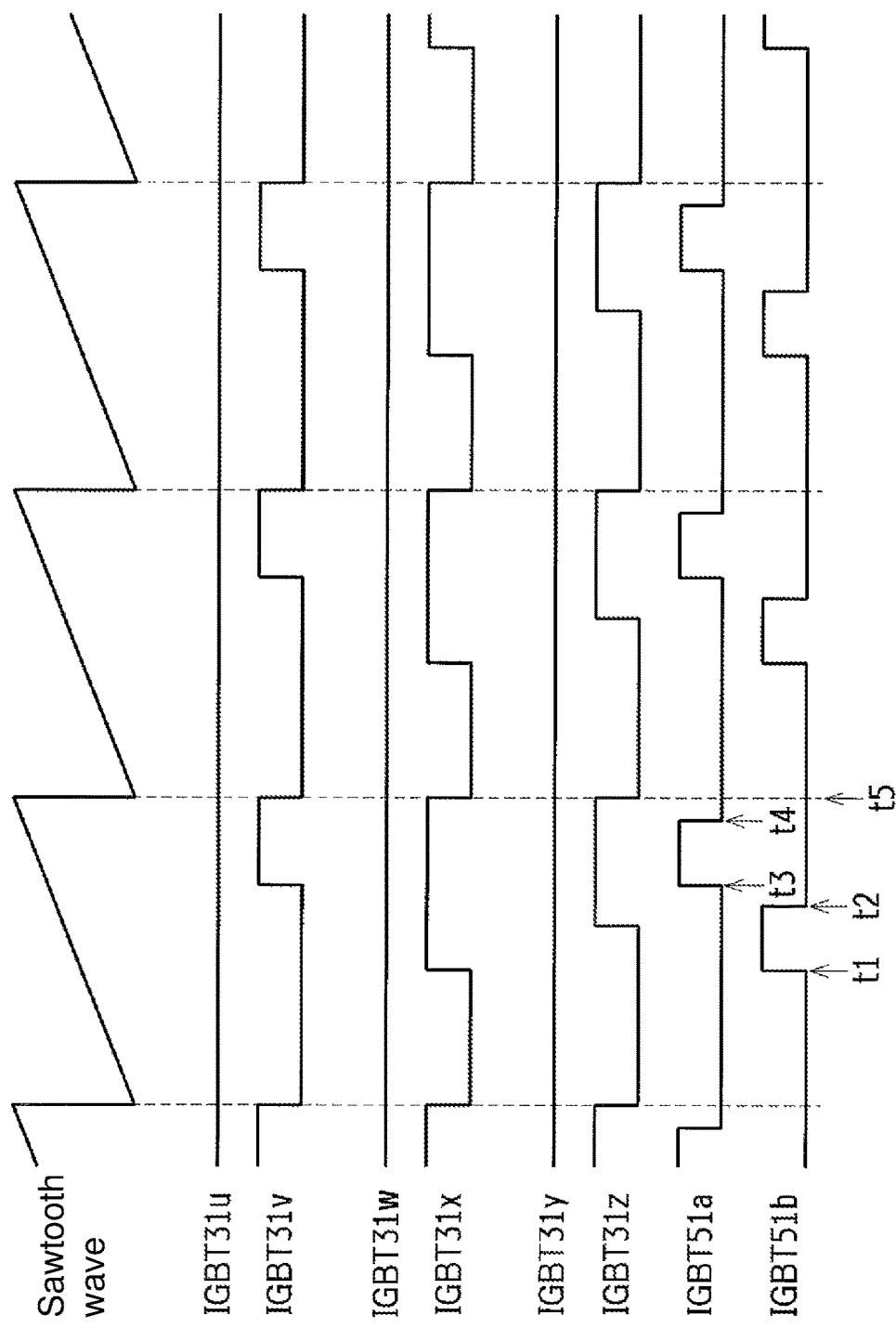
FIG. 5 is a timing chart illustrating operation of the PFC circuit.

As illustrated in FIG. 5, in the control device 200, a sawtooth wave is generated at the switching frequency, and timing of tuning off the IGBTs 31x, 31v, and 31z is matched with a terminal end of the sawtooth wave. At this point, the timing of turning off the IGBTs 31x, 31v, and 31z varies because the duty ratios of the IGBTs 31x, 31v, and 31z differ from one another.

In the example of FIG. 5, because only the IGBT 31v is turned on in the upper arm, the IGBT 51a is turned on in timing of turning on the IGBT 31v. The IGBTs 31x and 31z are turned on in the lower arm. However, because the IGBT 31x is initially turned on, the IGBT 51b is turned on in timing of turning on the IGBT 31x.

The operation in the switching cycle will be described below with reference to the timing chart in FIG. 5.

Figure 7:
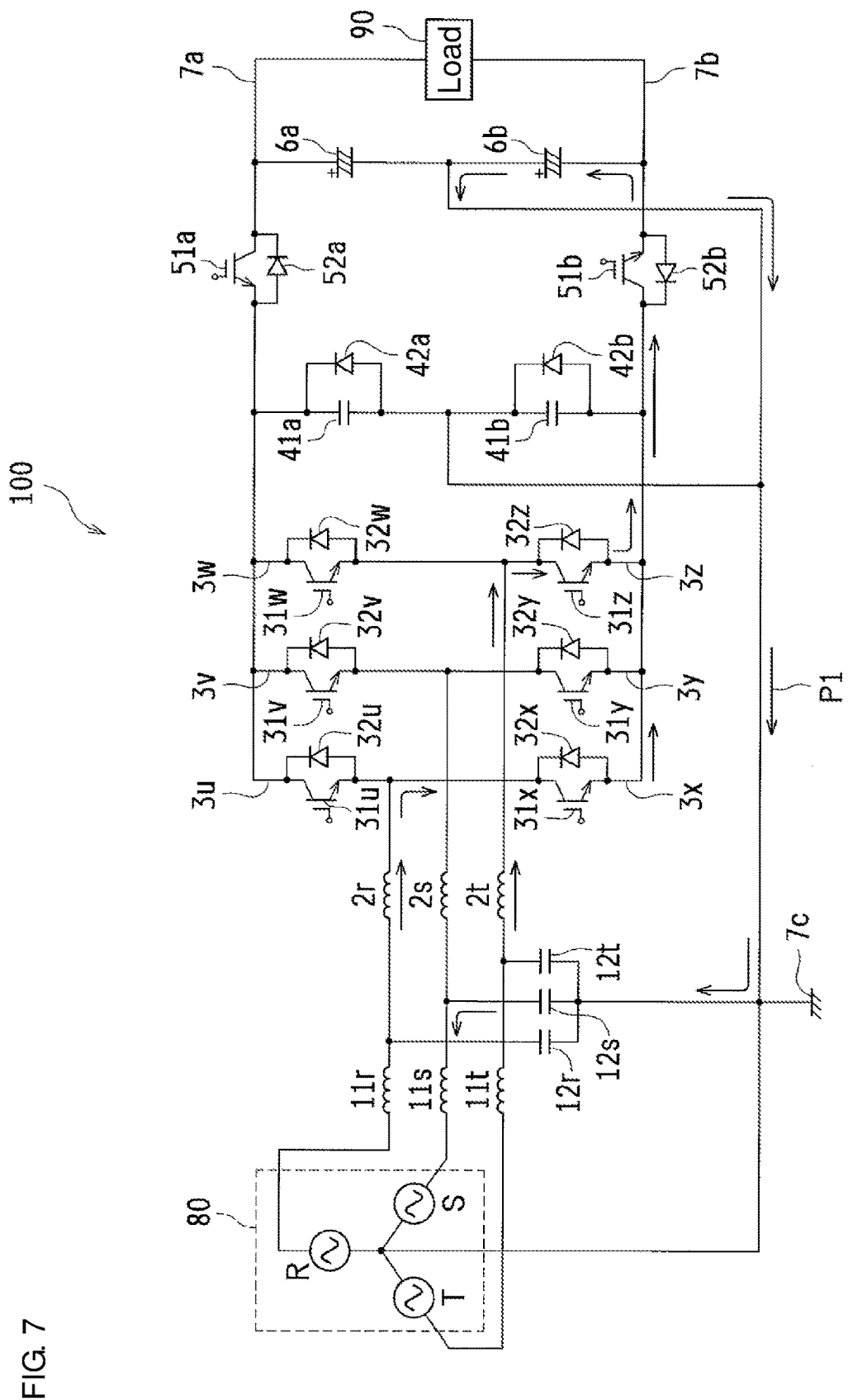
FIG. 7 is a view illustrating a state in which a current passage including a smoothing capacitor on a negative-line side is formed in the PFC circuit.

The IGBTs 31x and 51b are turned on at a point of time t1. Therefore, a current passage P1 from the reactor 2r to the S phase through the IGBTs 31x and 51b, smoothing capacitor 6b, and neutral point 7c is formed as illustrated in FIG. 7. When the IGBT 31z is turned on, the current from the reactor 2t is merged into the current passage P1 on the negative line 7b through the IGBT 31z.

At this point, the large-capacity smoothing capacitor 6b charged with $V_{dc}/2$ is disposed in the current passage P1. For this reason, because the impedance of the current passage P1 can be lowered, current $I_{L-R}$ (see FIG. 6) passed through the reactor 2r easily rises even if the R-phase AC voltage $e_{ac-R}$ is close to the zero volt. That is, the smoothing capacitor 6b acts as the power supply to assist the current $I_{L-R}$ of the reactor 2r.

In the conventional PFC, when the AC voltage is close to the zero volt, the distortion is generated in the input current because the current passed through the reactor hardly rises. On the other hand, in the first embodiment, even if the AC voltage $e_{ac-R}$ is close to the zero volt, the current $I_{L-R}$ passed through the reactor 2r easily rises by forming the low-impedance current passage P1 including the smoothing capacitor 6b. That is, even if the AC voltage $e_{ac-R}$ is close to the zero volt, the waveform of the input current $I_{ac,filt-R}$ can be shaped by properly controlling the current $I_{L-R}$ passed through the reactor 2r.

The PFC circuit 100 operates in the DCM, and the current is not passed through the reactor 2r when the IGBTs 31x and 51b are turned on. Therefore, the ZCS (Zero Current Switching) is performed. Because the current is not passed through the reactor 2t when the IGBT 31z is turned on, the ZCS is performed.

Figure 8:
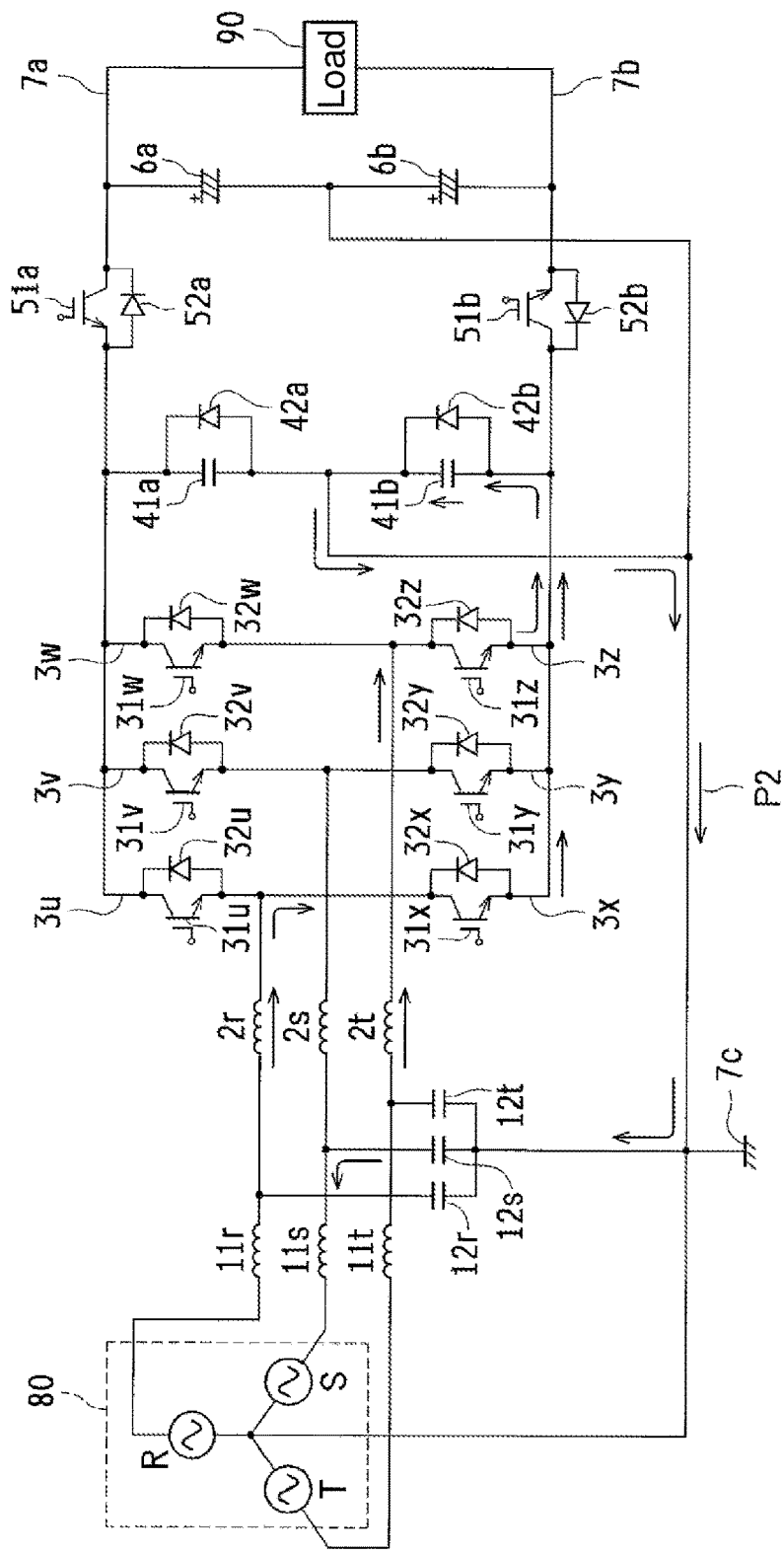
FIG. 8 is a view illustrating a state in which the current passage including a snubber capacitor on the negative-line side is formed in the PFC circuit.

Then, the IGBT 51b is turned off at a point of time t2 in FIG. 5. Therefore, a current passage P2 from the reactor 2r to the S phase through the IGBT 31x, negative line 7b, snubber capacitor 41b, and neutral point 7c is formed as illustrated in FIG. 8. The current from the reactor 2t is merged into the current passage P2 on the negative line 7b through the IGBT 31z.

Figure 6:
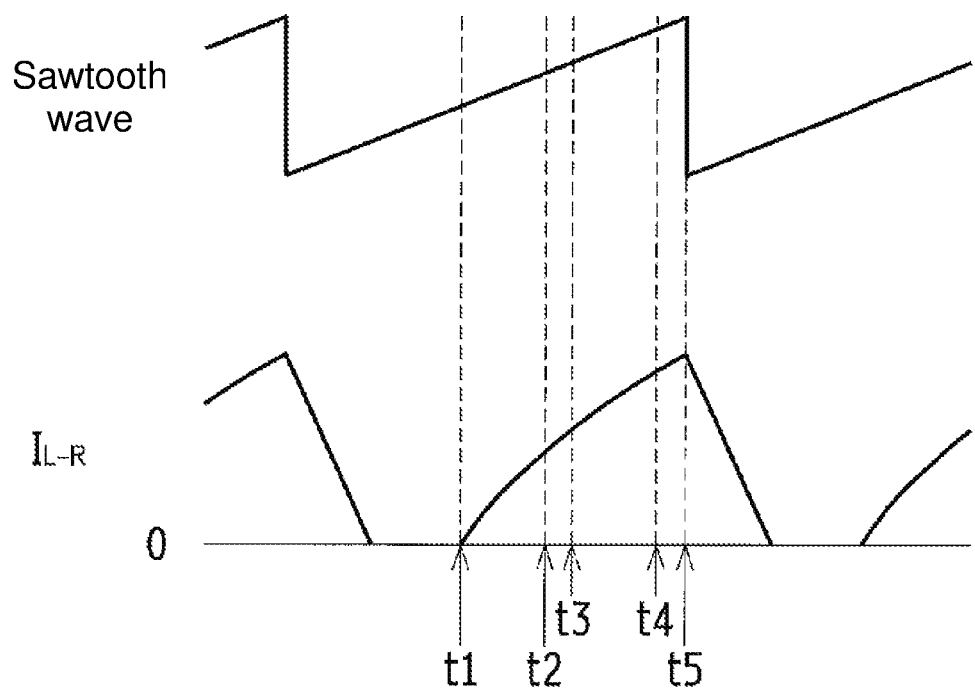
FIG. 6 is an enlarged view schematically illustrating the waveform of the current passed through an R-phase reactor of the PFC circuit.
Figure 9:
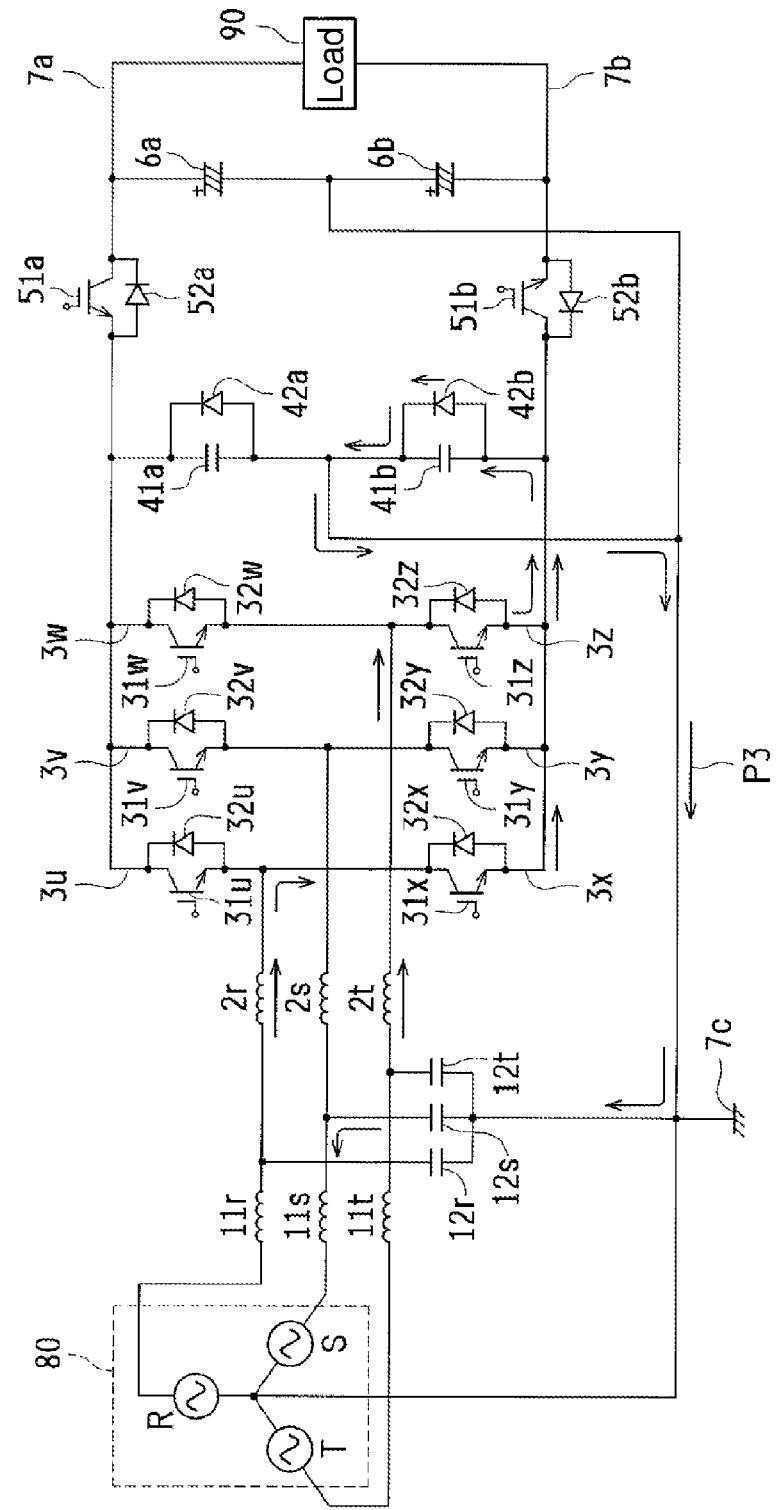
FIG. 9 is a view illustrating a state in which the snubber capacitor on the negative-line side is discharged in the PFC circuit.

Therefore, the snubber capacitor 41b is discharged. At this point, the current is being passed at the point of time t2 as illustrated in FIG. 6, so that the discharge can be completed in a short time compared to the conventional case that the discharge is initially performed with a small current. Then, a current passage P3 from the reactor 2r to the S phase through the IGBT 31x, negative line 7b, diode 42b, and neutral point 7c is formed as illustrated in FIG. 9. The current from the reactor 2t is merged into the current passage P2 on the negative line 7b through the IGBT 31z.

Figure 10:
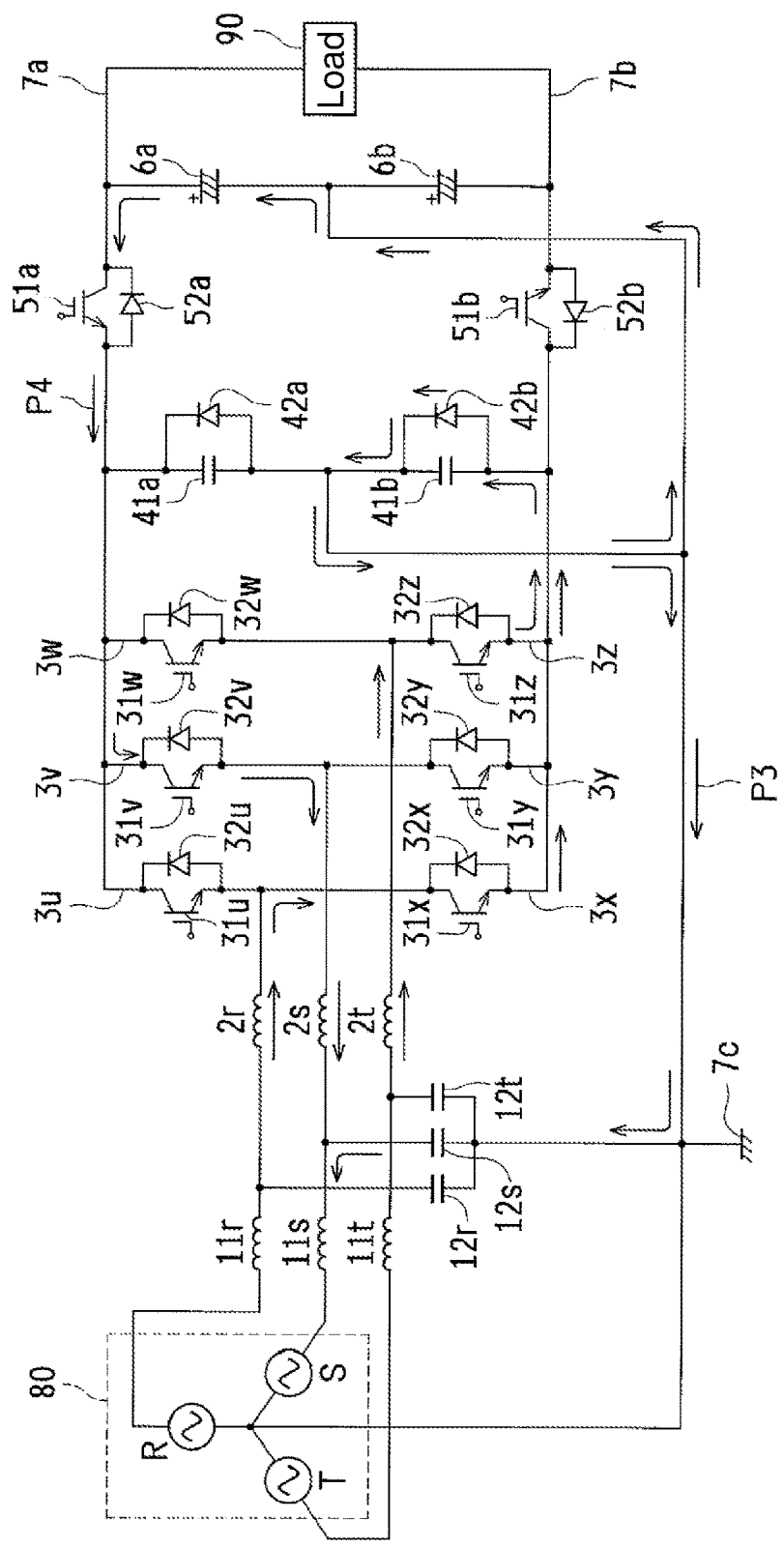
FIG. 10 is a view illustrating a state in which the current passage including the smoothing capacitor on a positive-line side is formed in the PFC circuit.

Then, the IGBTs 31v and 51a are turned on at a point of time t3. Therefore, a current passage P4, which is branched from the neutral point 7c and passed through the reactor 2s through the smoothing capacitor 6a and IGBTs 51a and 31v, is formed in addition to the current passage P3 as illustrated in FIG. 10. Because the current is not passed through the reactor 2s when the IGBTs 31v and 51a are turned on. Therefore, the ZCS (Zero Current Switching) is performed.

Figure 11:
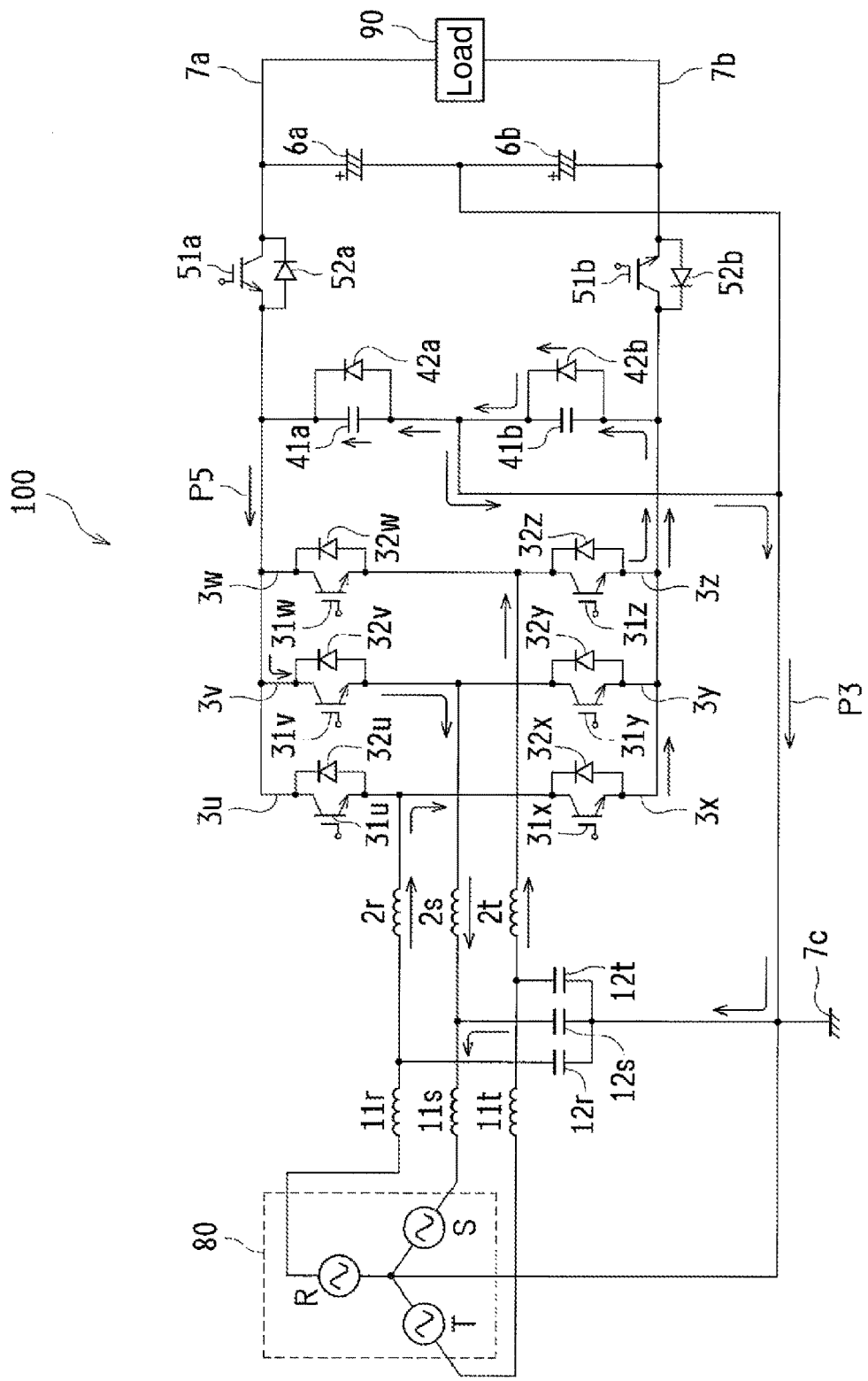
FIG. 11 is a view illustrating a state in which the current passage including the snubber capacitor on the positive-line side is formed in the PFC circuit.

Then, the IGBT 51a is turned off at a point of time t4 in FIG. 5. Therefore, a current passage P5, which is branched from the neutral point 7c and passed through the reactor 2s through the snubber capacitor 41a, positive line 7a, and IGBT 31v, is formed in addition to the current passage P3 as illustrated in FIG. 11.

Figure 12:
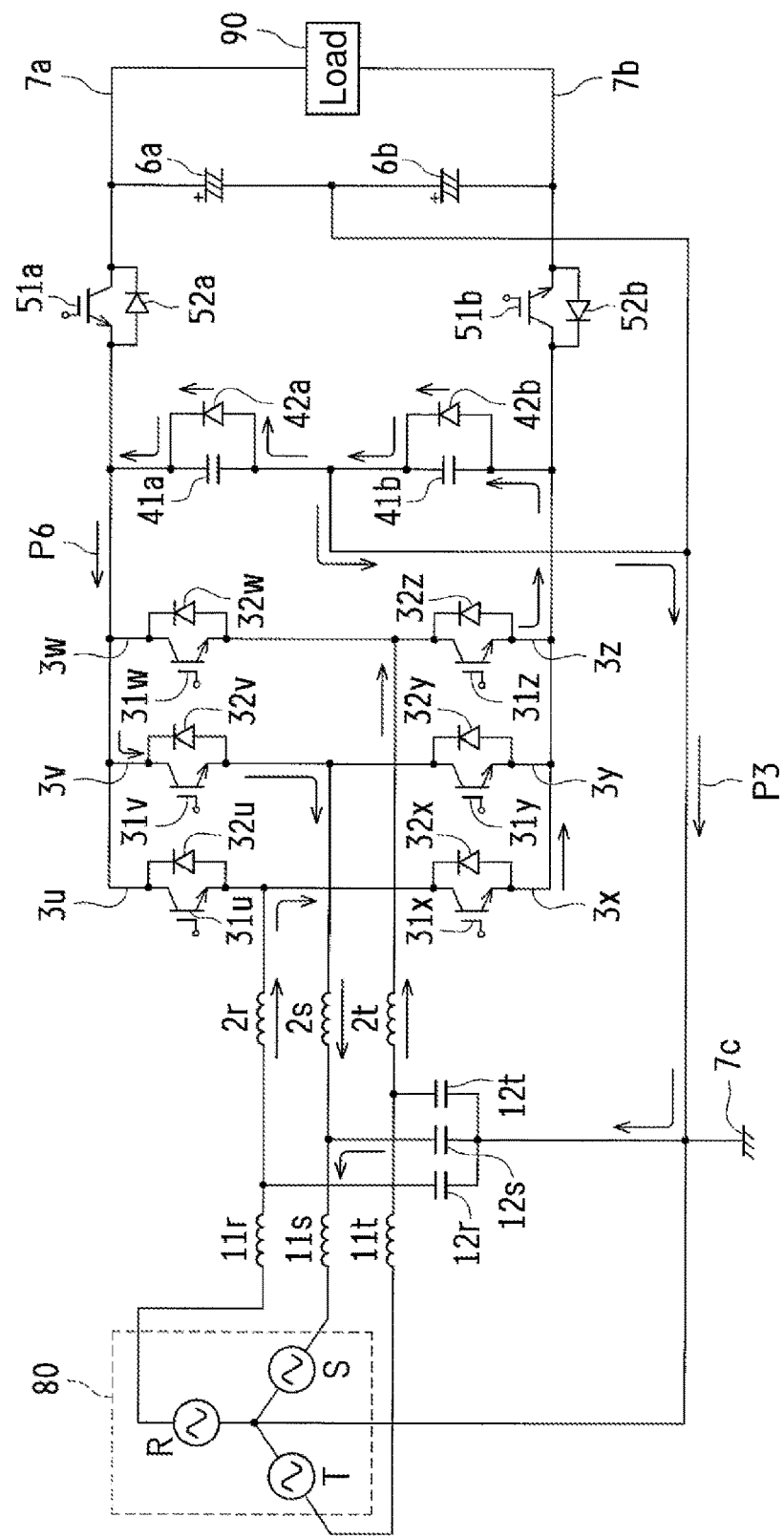
FIG. 12 is a view illustrating a state in which the snubber capacitor on the positive-line side is discharged in the PFC circuit.

Therefore, the snubber capacitor 41a is discharged. When the discharge is completed, a current passage P6, which is branched from the neutral point 7c and passed through the reactor 2s through the diode 42a, positive line 7a, and IGBT 31v, is formed in addition to the current passage P3 as illustrated in FIG. 12. Instead of these passages, sometimes the current from the reactor 2r is passed through the reactor 2s through the diode 32u, positive line 7a, and IGBT 31v or through the IGBT 31x, negative line 7b, and diode 32y depending on the impedance. The same holds true for the current from the reactor 2t.

Then, the IGBTs 31x, 31v, and 31z are turned off at a point of time t5 in FIG. 5. When the IGBTs 31x, 31v, and 31z are turned off, the snubber capacitors 41a and 41b are discharged to establish the zero volt between the legs. Therefore, the ZVS (Zero Voltage Switching) is performed.

Figure 13:
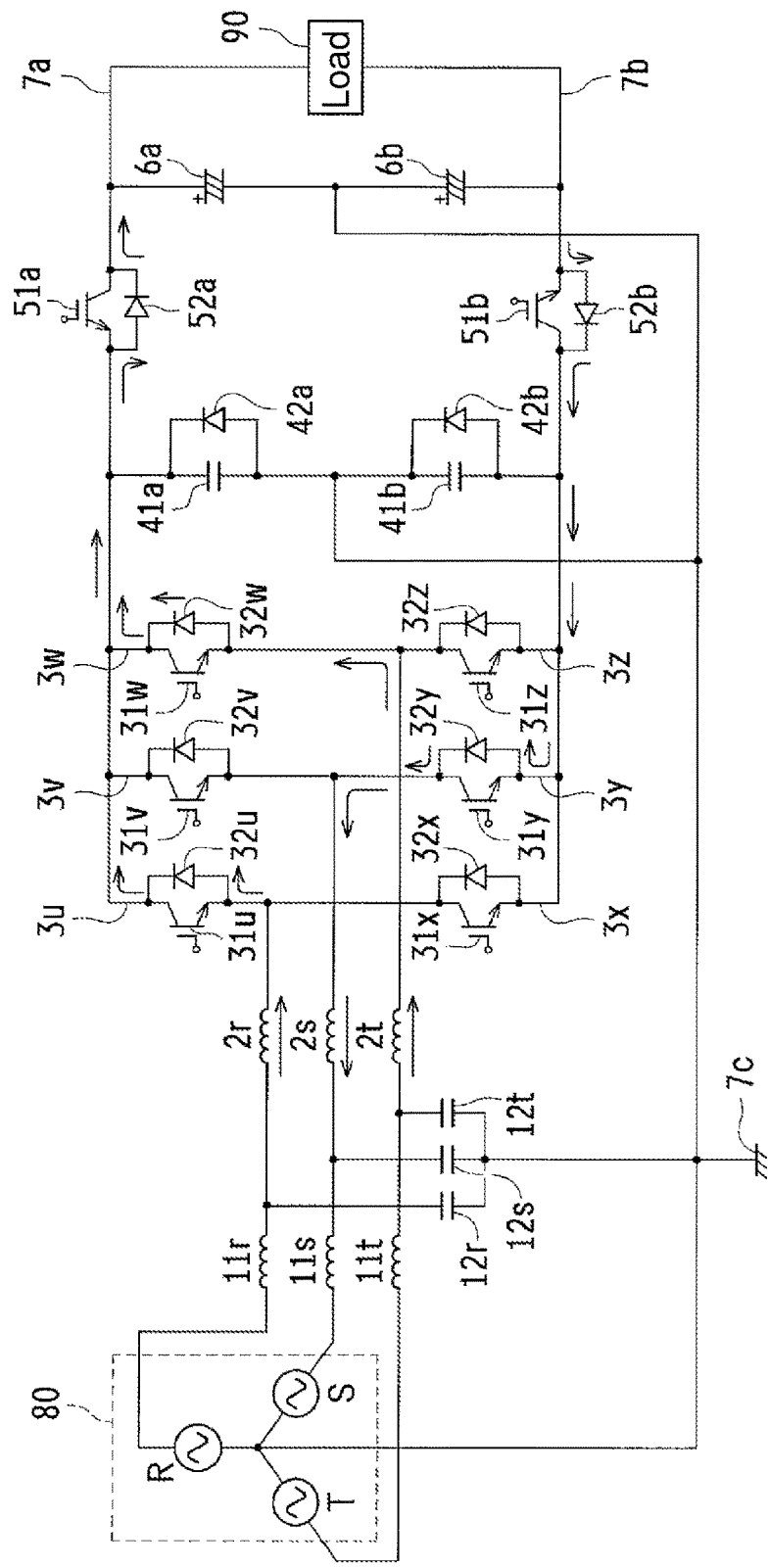
FIG. 13 is a view illustrating a state in which power is supplied to a load in the PFC circuit.

When the IGBTs 31x, 31v, and 31z are turned off, as illustrated in FIG. 13, the current is passed from the reactor 2r to the side of the load 90 through the diodes 32u and 52a, and the current is passed from the reactor 2t to the side of the load 90 through the diodes 32w and 52a. The current is also passed from the side of the load 90 to the reactor 2s through the diodes 52b and 32y. At this point, the snubber capacitors 41a and 41b are charged to absorb the transient high voltage.

Then, as illustrated in FIG. 6, the currents are not passed through the reactors 2r, 2s, and 2t. The above operation is repeated at the switching frequency.

In the above example, the current $I_{L-R}$ is assisted by the turn-off of the IGBT 51b because the IGBT 31x in the lower arm is turned on in advance of the turn-on of the IGBT 31v in the upper arm. On the other hand, the current is assisted by the turn-on of the IGBT 51a in the case that the upper-arm IGBT is turned on in advance of the turn-on of the lower-arm IGBT. That is, depending on situations of the AC voltages $e_{ac-R}$, $e_{ac-S}$, and $e_{ac-T}$ supplied from the three-phase AC power supply 80, sometimes the current is assisted by the IGBT 51b and smoothing capacitor 6b, and sometimes the current is assisted by the IGBT 51a and smoothing capacitor 6a.

(Effect)

As described above, the PFC circuit 100 of the first embodiment includes the two snubber capacitors 41a and 41b connected in series between the positive line 7a and the negative line 7b, the two smoothing capacitors 6a and 6b connected in series between the positive line 7a and the negative line 7b, the IGBT 51a provided on the positive line 7a between the snubber capacitor 41a and the smoothing capacitor 6a, and the IGBT 51b provided on the negative line 7b between the snubber capacitor 41b and the smoothing capacitor 6b. The neutral point 7c is connected between the snubber capacitors 41a and 41b, and the neutral point 7c is connected between the smoothing capacitors 6a and 6b.

Figure 14:
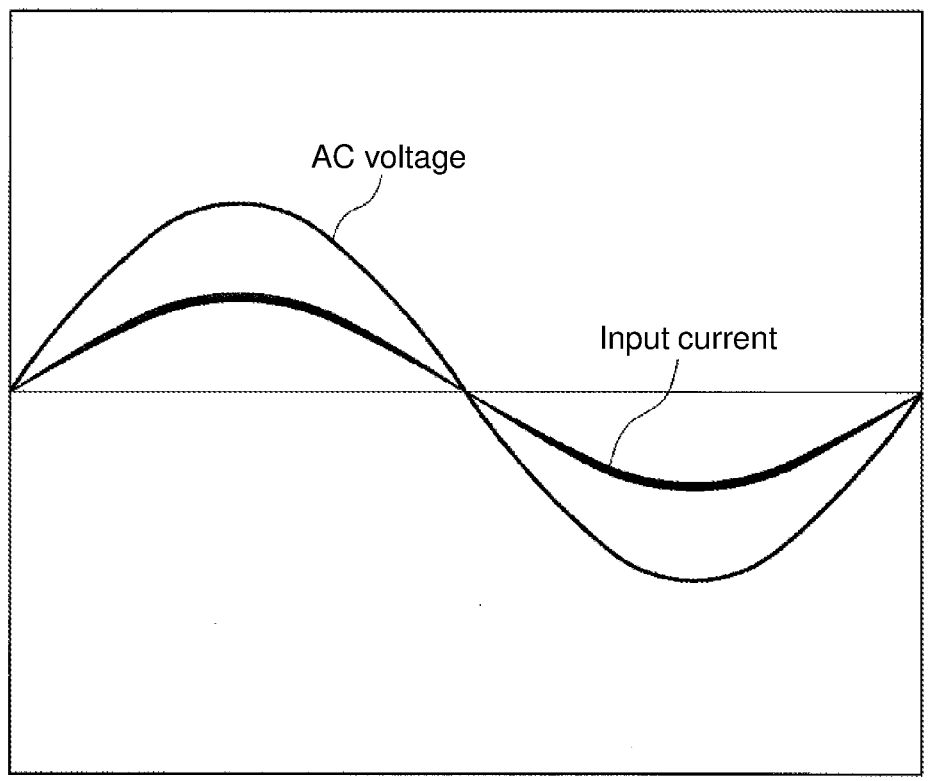
FIG. 14 is a view illustrating the waveforms of the AC voltage and input current of a predetermined phase in the PFC circuit of the first embodiment.

In the configuration of the first embodiment, even if the AC voltage $e_{ac-R}$ ($e_{ac-S}$, $e_{ac-T}$) is close to the zero crossing, the IGBT 51b (51a) forms the low-impedance current passage P1 through the smoothing capacitor 6b (6a) to facilitate the rise of the current passed through the reactor 2r (2s, 2t), so that the waveform of the input current $I_{ac,filt-R}$ ($I_{ac,filt-S}$, $I_{ac,filt-T}$) can be shaped as illustrated in FIG. 14. That is, the THD can be lowered.

Additionally, in the first embodiment, the snubber capacitor 41b (41a) is discharged from the state in which the current is being passed, so that the discharge can be completed in a short time compared to the conventional case that the discharge is initially performed with a small current. Therefore, the waveform of the input current $I_{ac,filt-R}$ ($I_{ac,filt-S}$, $I_{ac,filt-T}$) can hardly be distorted.

In the first embodiment, the turn-on of the IGBTs 31x, 31v, and 31z (31u, 31y, 31w) becomes the ZCS by operating the PFC 100 in the DCM, so that the switching loss can be reduced.

In the first embodiment, the IGBTs 31x, 31v, and 31z (31u, 31y, 31w) are turned off while the snubber capacitors 41a and 41b are discharged, thereby becoming the ZVS. Therefore, the switching loss can be reduced.

Second Embodiment

Figure 15:
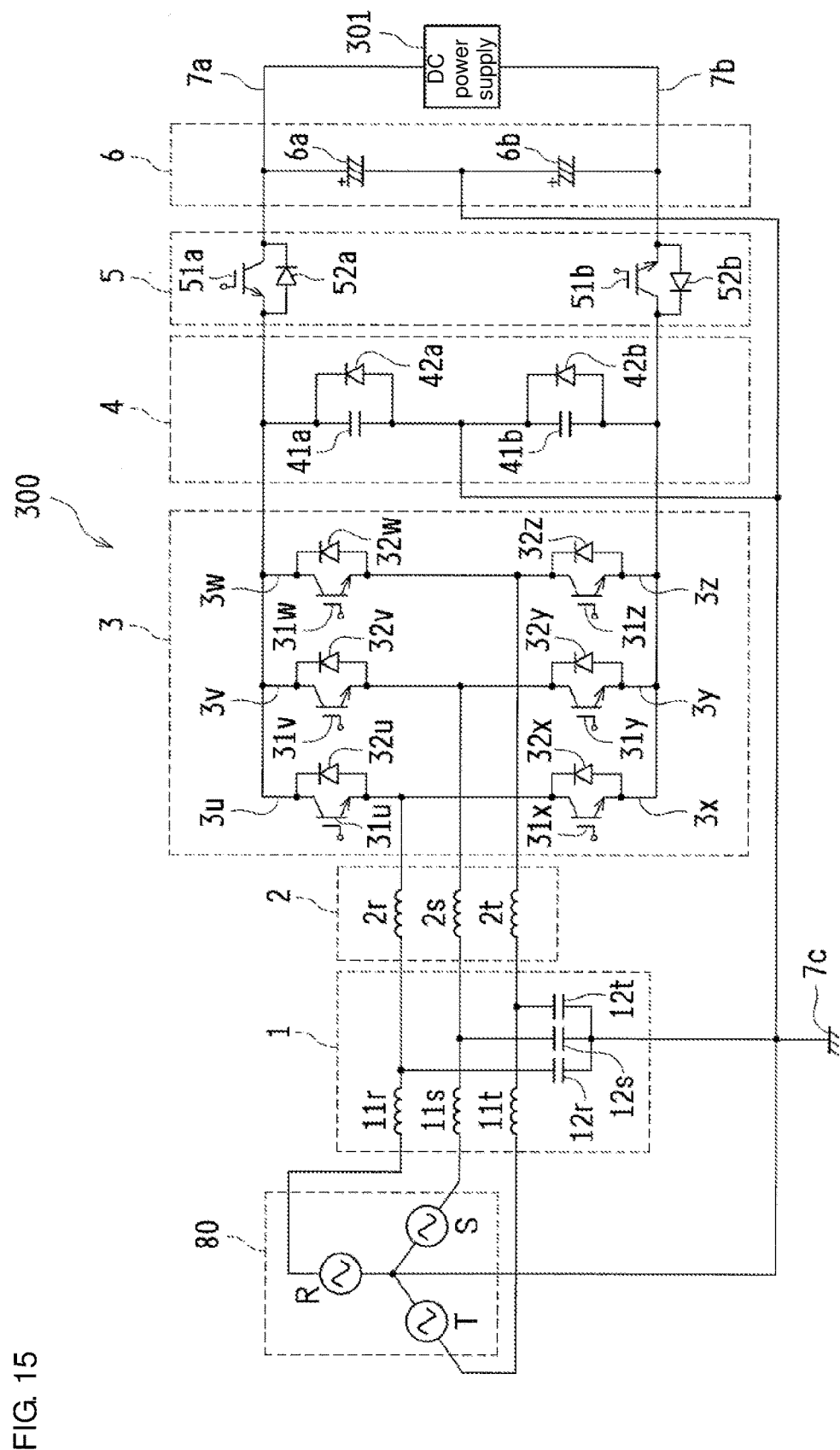
FIG. 15 is a circuit diagram illustrating a configuration of an inverter according to a second embodiment of the present invention.
Figure 16:
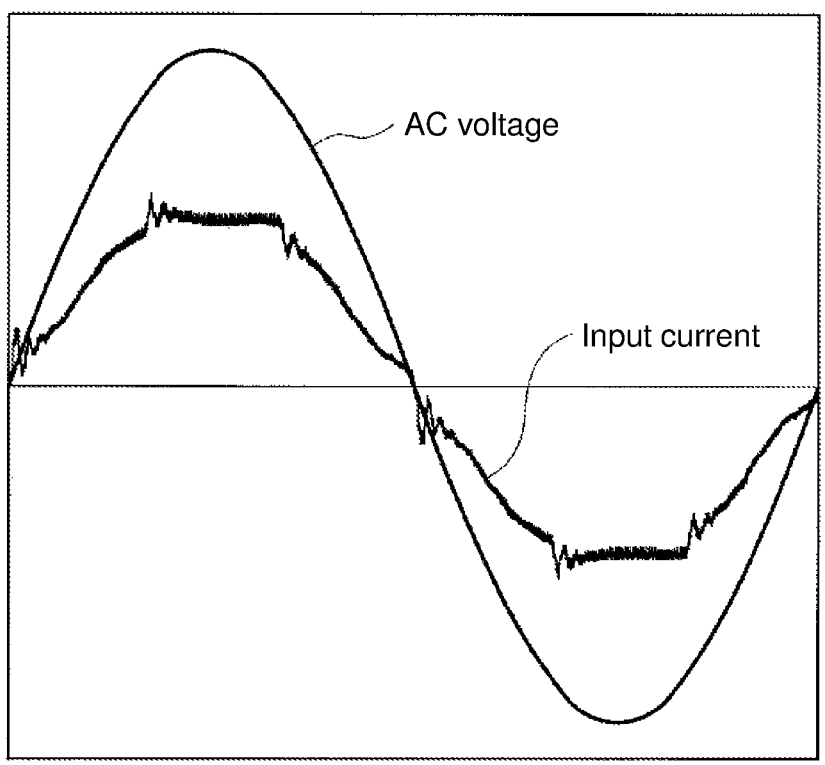
FIG. 16 is a view illustrating waveforms of the AC voltage and input current of a predetermined phase in a conventional PFC circuit.

An inverter 300 according to a second embodiment of the present invention will be described below with reference to FIG. 15. The inverter 300 is an example of the "power conversion device" of the present invention.

In the inverter 300, a DC power supply 301 is connected to the input side, and the three-phase AC power supply (system power supply) 80 is connected to the output side. That is, in the inverter 300, input and output directions are opposite to the PFC circuit 100 of the first embodiment. The circuit configuration of the inverter 300 is similar to that of the PFC circuit 100.

The second embodiment differs from the first embodiment in a calculation formula calculating the duty ratio of the PWM signal.

Specifically, the duty ratio at which the IGBT 31u or 31x is driven is calculated from the following equation (4).

[Mathematical formula 4]

$$\text{Duty\_Iux} = \sqrt{\sqrt{2}\, I_{ac,filt-R}\, \frac{L_{reso-R} f_{sw}\left(\frac{V_{dc}}{2} + |e_{ac-R}|\right)|\sin\theta_R|}{\frac{V_{dc}}{2}\left(\frac{V_{dc}}{2} - |e_{ac-R}|\right)}} \quad (4)$$

In the equation (4), Duty_Iux is the duty ratio of the selected IGBT 31u or 31x. $I_{ac,filt-R}$[A] is the current output to the R phase, and $V_{dc}$[V] is the voltage at the DC power supply 301.

The duty ratio at which the IGBT 31v or 31y is driven is calculated from the following equation (5).

[Mathematical formula 5]

$$\text{Duty\_Ivy} = \sqrt{\sqrt{2}\, I_{ac,filt-S}\, \frac{L_{reso-S} f_{sw}\left(\frac{V_{dc}}{2} + |e_{ac-S}|\right)|\sin\theta_S|}{\frac{V_{dc}}{2}\left(\frac{V_{dc}}{2} - |e_{ac-S}|\right)}} \quad (5)$$

In the equation (5), Duty_Ivy is the duty ratio of the selected IGBT 31v or 31y. $I_{ac,filt-S}$[A] is the current output to the S phase, and $V_{dc}$[V] is the voltage at the DC power supply 301.

The duty ratio at which the IGBT 31w or 31z is driven is calculated from the following equation (6).

[Mathematical formula 6]

$$\text{Duty\_Iwz} = \sqrt{\sqrt{2}\, I_{ac,filt-T}\, \frac{L_{reso-T} f_{sw}\left(\frac{V_{dc}}{2} - |e_{ac-T}|\right)|\sin\theta_T|}{\frac{V_{dc}}{2}\left(\frac{V_{dc}}{2} + |e_{ac-T}|\right)}} \quad (6)$$

In the equation (6), Duty_Iwz is the duty ratio of the selected IGBT 31w or 31z. $I_{ac,filt-T}$[A] is current output to the T phase, and $V_{dc}$[V] is voltage at the DC power supply 301.

The inverter 300 that performs soft switching can be obtained in the second embodiment.

Other Embodiments

The disclosed embodiments are illustrative only in all respects, and do not become the basis of the limited interpretation. Accordingly, the technical scope of the present invention should be interpreted not by the embodiments but by the claims. The technical scope of the present invention includes the meanings equivalent to the claims and all changes within the claims.

For example, in the first embodiment, the three-phase PFC circuit 100 is described by way of example. Alternatively, the present invention may be applied to a single-phase PFC. The same holds true for the inverter 300 of the second embodiment.

In the first and second embodiments, by way of example, the IGBT 31u and the diode 32u are provided in the U-phase arm 3u. Alternatively, a reversely conductive semiconductor switch may be provided in the U-phase arm. The same holds true for the V-phase arm, the W-phase arm, the X-phase arm, the Y-phase arm, and the Z-phase arm. Similarly, the reversely conductive semiconductor switch may be provided instead of the IGBT 51a and the diode 52a, or the reversely conductive semiconductor switch may be provided instead of the IGBT 51b and the diode 52b.

In the first embodiment, the switch circuit 5 is always driven in each switching cycle by way of example. Alternatively, the switch circuit 5 may be driven when the AC voltage $e_{ac-R}$, $e_{ac-S}$, or $e_{ac-T}$ is close to the zero crossing, and the switch circuit 5 may be configured not to be driven in other cases (when the AC voltages $e_{ac-R}$, $e_{ac-S}$, and $e_{ac-T}$ are close to the zero crossing).

In the first embodiment, by way of example, the IGBTs 51a and 51b are turned on in different timings during the switching cycle. Alternatively, when one of the IGBTs 51a and 51b is turned on during the switching cycle, the other may be configured not to be driven.

In the first embodiment, by way of example, the smoothing capacitors 6a and 6b are used as the power supply that assists the current. Alternatively, the power supply that assists the current may separately be provided.

INDUSTRIAL APPLICABILITY

The present invention can be applied to the power conversion device and the control device that controls the power conversion device.

DESCRIPTION OF SYMBOLS 1 high-frequency filter (filter)
2r, 2s, 2t reactor
bridge circuit
3u U-phase arm (arm)
3v V-phase arm (arm)
3w W-phase arm (arm)
3x X-phase arm (arm)
3y Y-phase arm (arm)
3z Z-phase arm (arm)
31u, 31v, 31w, 31x, 31y, 31z IGBT (switch element)
4 snubber circuit
41a, 41b snubber capacitor
5 switch circuit
51a IGBT (first switch)
51b IGBT (second switch)
6 smoothing circuit
6a, 6b smoothing capacitor
7a positive line
7b negative line
7c neutral point
100 PFC (power conversion device)
200 control device
300 inverter (power conversion device)

The invention claimed is:

1. A power conversion device comprising:
a bridge circuit in which a switch element is provided in each of a plurality of arms;
a filter that is provided on an alternating current side of the bridge circuit, and connected to a neutral point;
a reactor provided between the bridge circuit and the filter;
a smoothing circuit provided on a direct current side of the bridge circuit;
a snubber circuit provided between the bridge circuit and the smoothing circuit; and
a switch circuit provided between the smoothing circuit and the snubber circuit,
wherein
the smoothing circuit comprises a first smoothing capacitor and a second smoothing capacitor connected in series between a positive line and a negative line,
the neutral point is connected between the first and second smoothing capacitors,
the snubber circuit comprises a first snubber capacitor and a second snubber capacitor connected in series between the positive line and the negative line, a first diode connected in parallel with the first snubber capacitor, and a second diode connected in parallel with the second snubber capacitor,
the neutral point is connected between the first and second snubber capacitors and the first and second diodes, and
the switch circuit comprises a first switch provided on the positive line and a second switch provided on the negative line.

2. The power conversion device according to claim 1, wherein current is discontinuously passed through the reactor.

3. The power conversion device according to claim 2, wherein
the switch elements of the bridge circuit are driven with different duty ratios,
the first switch is turned on when one of the switch elements of an upper arm in the bridge circuit is initially turned on in each switching cycle, and the second switch is turned on when one of the switch elements of a lower arm in the bridge circuit is initially turned on in each switching cycle.

4. The power conversion device according to claim 2, wherein the switch element of the bridge circuit is turned off while the first and second snubber capacitors are discharged.

5. The power conversion device according to claim 3, wherein the switch element of the bridge circuit is turned off while the first and second snubber capacitors are discharged.

6. The power conversion device according to claim 1, wherein
the switch elements of the bridge circuit are driven with different duty ratios,
the first switch is turned on when one of the switch elements of an upper arm in the bridge circuit is initially turned on in each switching cycle, and
the second switch is turned on when one of the switch elements of a lower arm in the bridge circuit is initially turned on in each switching cycle.

7. The power conversion device according to claim 6, wherein the switch element of the bridge circuit is turned off while the first and second snubber capacitors are discharged.

8. The power conversion device according to claim 1, wherein the switch element of the bridge circuit is turned off while the first and second snubber capacitors are discharged.

9. A control device configured to control a power conversion device,
wherein
the power conversion device comprises:
a bridge circuit in which a switch element is provided in each of a plurality of arms;
a filter that is provided on an alternating current side of the bridge circuit, and connected to a neutral point;
a reactor provided between the bridge circuit and the filter;
a smoothing circuit provided on a direct current side of the bridge circuit;
a snubber circuit provided between the bridge circuit and the smoothing circuit; and
a switch circuit provided between the smoothing circuit and the snubber circuit,
the smoothing circuit comprises a first smoothing capacitor and a second smoothing capacitor connected in series between a positive line and a negative line,
the neutral point is connected between the first and second smoothing capacitors,
the snubber circuit comprises a first snubber capacitor and a second snubber capacitor connected in series between the positive line and the negative line, a first diode connected in parallel with the first snubber capacitor, and a second diode connected in parallel with the second snubber capacitor,
the neutral point is connected between the first and second snubber capacitors and the first and second diodes,
the switch circuit comprises a first switch provided on the positive line and a second switch provided on the negative line, and the control device is configured to control the bridge circuit and the switch circuit based on an input voltage, an input current, and an output voltage of the power conversion device.

\* \* \* \* \*